United States Patent

Betz et al.

[11] Patent Number: 6,057,650
[45] Date of Patent: May 2, 2000

[54] INPUT CIRCUIT FOR THE STARTER OF A HIGH-PRESSURE GAS-FILLED DISCHARGE LAMP

[75] Inventors: Dieter Betz; Ulrich Drews, both of Vaihingen; Thomas Gross, Waiblingen; Bernd Rothfuss, Niefern-Oeschelbronn; Thomas Kienzler, Reutlingen, all of Germany

[73] Assignee: Robert Bosch GmbH, Stuttgart, Germany

[21] Appl. No.: 09/077,775
[22] PCT Filed: Sep. 2, 1996
[86] PCT No.: PCT/DE96/01620
§ 371 Date: Aug. 31, 1998
§ 102(e) Date: Aug. 31, 1998
[87] PCT Pub. No.: WO97/21328
PCT Pub. Date: Jun. 12, 1997

[30] Foreign Application Priority Data

Dec. 1, 1995 [DE] Germany ............................ 195 44 842

[51] Int. Cl.$^7$ .................................................... H05B 37/00
[52] U.S. Cl. .......................... 315/289; 315/290; 315/239; 315/240; 315/82
[58] Field of Search ...................................... 315/289, 290, 315/276, 282, 206, DIG. 7, 82, 219, 228 R, 239, 245, 240

[56] References Cited

U.S. PATENT DOCUMENTS

| 4,461,982 | 7/1984 | Fahnrich | 315/290 |
| 4,469,981 | 9/1984 | Ruff et al. | 315/205 |
| 4,714,862 | 12/1987 | Dannert et al. | 315/244 |
| 4,724,360 | 2/1988 | Luursema | 315/244 |

*Primary Examiner*—Haissa Philogene
*Attorney, Agent, or Firm*—Kenyon & Kenyon

[57] ABSTRACT

A high-pressure gas discharge lamp is connected on one side to a lead across the secondary winding of a starter transformer and to a second lead on the second side. Starting energy is applied with a pulse. For this purpose, a controllable switch which becomes conducting on reaching a certain voltage or is connected by a drive is provided in series with the primary winding. A capacitor connected in parallel to the series connection is charged by voltage U between the input terminals across a resistor connected in series and a diode. An input circuit provided between these input terminals of the starter has a capacitor, a protective element or a combination of the two for protection against voltage peaks.

9 Claims, 1 Drawing Sheet

INPUT CIRCUIT FOR THE STARTER OF A HIGH-PRESSURE GAS-FILLED DISCHARGE LAMP

FIELD OF THE INVENTION

The present invention relates to an input circuit for a starter for a high-pressure gas discharge lamp which can be used in automotive headlights in particular.

BACKGROUND OF INFORMATION

German Patent No. 40 17 415 describes a conventional starter including a starter transformer whose primary winding receives a voltage. The secondary winding transforms this voltage up to the voltage needed to start the lamp. On the primary side, a capacitor is connected in parallel to the series connection of the primary winding and a controllable switch formed by a controlled thyristor. For starting, this capacitor is charged to a voltage which is then effective and applied at this time. On reaching a certain voltage, the controllable switch is then switched through, and the capacitor is discharged.

With this conventional starter, there is no input circuit or other arrangement to ensure that the voltage surges which always occur when starting a high-pressure gas discharge lamp are prevented or at least rendered mostly harmless. At the moment of the sudden break-through of gas within the high-pressure gas discharge lamp, extreme voltage peaks occur, also acting on the primary side and at the power supply terminals via the starter transformer.

SUMMARY OF THE INVENTION

The input circuit according to the present invention has the advantage over the related art of providing an effective protective circuit against excessively high voltage peaks and for the starter circuit itself and the power supply circuit supplying the power. Due to the input circuit designed according to the present invention as a protective circuit for the starter, it is possible to use less expensive components and possibly a smaller number of components in the starter.

According to the present invention, this is achieved in principle by the fact that the input circuit is arranged between the input terminals of the starter and has a capacitor, a protective element or a combination of a capacitor and a protective element, and it provides protection for the starter and for the power supply circuit which delivers the power supply voltage.

In an exemplary embodiment of the present invention, the protective element is a varistor, a diac or a Zener diode.

According to an advantageous exemplary embodiment of the present invention, a switching element with or without a drive is provided as the controllable switch.

In an exemplary embodiment, a thyristor, a transistor, a field-effect transistor or a triggerable spark gap may be provided as the switching element with a drive. As an alternative in another advantageous exemplary embodiment, a switching spark gap, a diac or a break-over diode may be provided as the switching element without a drive.

BRIEF DESCRIPTION OF THE DRAWING

The FIGURE shows a schematic block diagram of an input circuit of a starter according to the present invention.

DETAILED DESCRIPTION OF THE INVENTION

Figure 1:
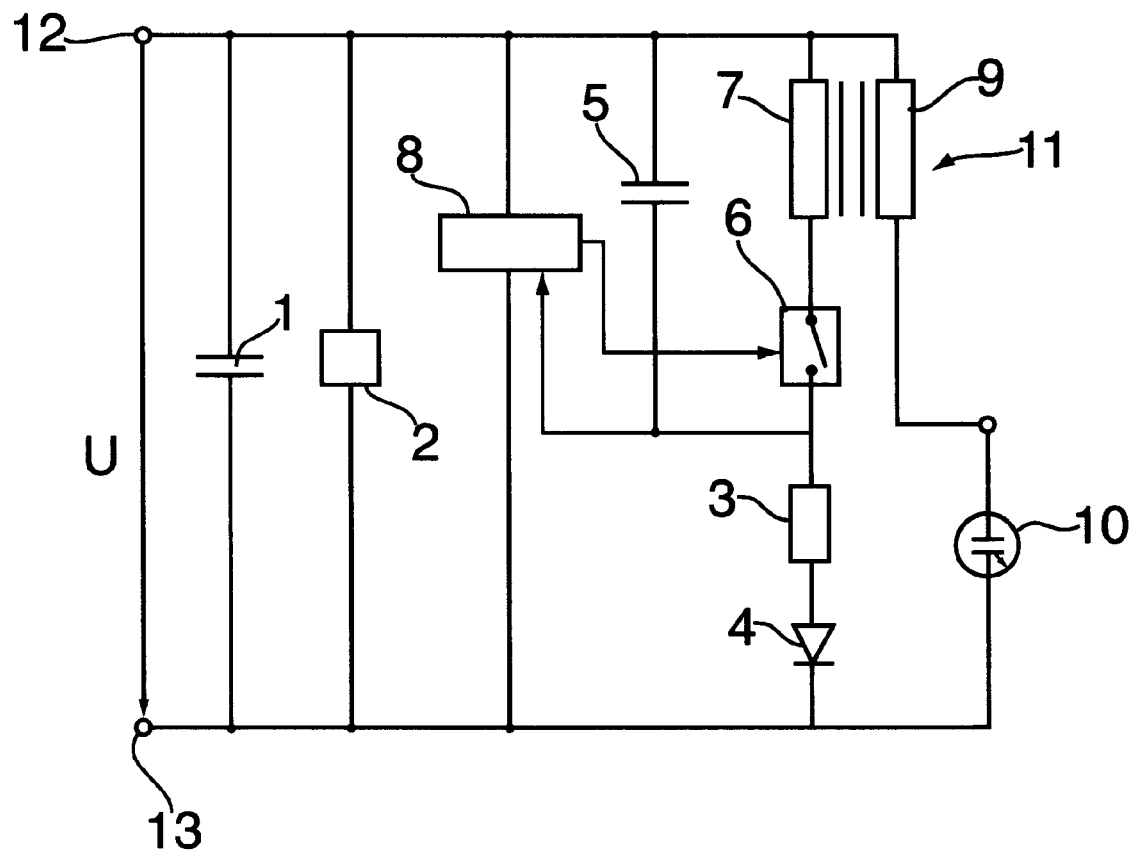

The FIGURE shows a schematic block diagram of the input circuit of a starter designed according to the present invention. A high-pressure gas discharge lamp 10 is connected on one side to a first connecting lead 12 of a power supply circuit (not shown) across a secondary winding 9 of a starter transformer 11. The high-pressure gas discharge lamp 10 is connected, on the other side, to a second connecting lead 13 of the power supply circuit. A power supply voltage U is applied between connecting leads 12 and 13. High-pressure gas discharge lamp 10 is supplied with power for starting and for burning over these two connecting leads 12 and 13.

The starting power is applied by the starter designed according to the present invention with a pulse. To do so, starter transformer 11 is provided with a primary winding 7 and secondary winding 9 which are closely linked together. A controllable switch 6, a resistor 3 and a diode 4 are provided in series with primary winding 7. Diode 4 may optionally be omitted. A capacitor 5 is arranged in parallel to the series connection of primary winding 7 and controllable switch 6. This capacitor 5 is in series with resistor 3 and diode 4 between connecting leads 12 and 13 and is thus charged by voltage U supplied by the power supply circuit (not shown). On reaching a certain voltage, the controllable switch is closed and thus suddenly becomes conductive. The starting pulse is generated in this way, permitting current to flow through primary winding 7. In the exemplary embodiment illustrated here, a driver circuit 8 which receives the voltage on capacitor 5 over a line sets the voltage and is responsible for the control, i.e., the closing of controllable switch 6, for example.

According to the present invention, an input circuit is provided for protection against excessively high voltage peaks between connecting leads 12 and 13, which represent the input of the starter circuit as seen from the power supply circuit. This input circuit has a capacitor 1, a protective element 2 or a combination of a capacitor 1 and a protective element 2. This provides protection for the starter and the power supply circuit which delivers power supply voltage U.

Protective element 2 may be a varistor, a diac or a Zener diode. Controllable switch 6 may be a switching element with or without a drive. A driver circuit 8 is provided in the exemplary embodiment illustrated in FIG. 1 to control switch 6. The switching element with a drive may be a thyristor, a transistor, a field-effect transistor or a triggerable spark gap. The switching element without a drive may be a switching spark gap, a diac or a break-over diode.

The starter circuit operates as follows. When the lamp is to be started, a higher direct voltage U is applied to connecting leads 12 and 13. Capacitor 5 is charged across resistor 3 and diode 4. Controllable switch 6 is closed by driving circuit 8 on reaching a certain voltage. Therefore, capacitor 5 is discharged into primary winding 7. The value of this pulse, stepped up, by secondary winding 9 according to the transformation ratio is delivered to high-pressure gas discharge lamp 10 to start it.

With the input circuit provided according to the present invention, both the starter circuit and the power supply circuit supplying power supply voltage U to connecting leads 12 and 13 are protected from excessive voltage peaks. In this way, inexpensive components can be used owing to the lower requirements regarding their electric strength, and optionally a smaller number of components may also be used for the starter on the whole.

What is claimed is:

1. An input circuit arrangement of a starter device, the starter device being a part of a high-pressure gas discharge lamp, comprising:

a starter transformer including a primary winding receiving a power supply voltage having a first value and a secondary winding starting the high-pressure gas discharge lamp with a second value of the power supply voltage, the second value being higher than the first value;

a controllable switch;

a first capacitor arranged parallel to a series circuit arrangement, the series circuit arrangement including the primary winding and the controllable switch, the primary winding being connected in series with the controllable switch, the first capacitor positioned on a primary side of the starter transformer, the first capacitor being charged when the power supply voltage is turned on, and the first capacitor being discharged by switching the controllable switch when the power supply voltage reaches a predetermined voltage; and an arrangement including at least one of a second capacitor and a protective element, wherein the input circuit arrangement is positioned between a first input terminal of the starter device and a second input terminal of the starter device, wherein the input circuit arrangement provides protection for the starter device and a power supply circuit arrangement, the power supply circuit arrangement delivering the power supply voltage, and wherein an elevated direct voltage is applied to the first and second input terminals for starting the high-pressure gas discharge lamp.

2. The input circuit arrangement according to claim 1, wherein a first side of the series circuit arrangement is coupled to the first input terminal and a second side of the series circuit arrangement is coupled to the second input terminal.

3. The input circuit arrangement according to claim 1, wherein the high-pressure gas discharge lamp includes an automotive headlight.

4. The input circuit arrangement according to claim 1, wherein the protective element includes at least one of a varistor, a diac and a Zener diode.

5. The input circuit arrangement according to claim 1, wherein the controllable switch includes one of a first switching element without a drive circuit arrangement and a second switching element including the drive circuit arrangement.

6. The input circuit arrangement according to claim 5, wherein the second switching element includes at least one of a thyristor, a transistor, a field effect transistor and a triggerable spark gap.

7. The input circuit arrangement according to claim 5, wherein the first switching element includes at least one of a switching spark gap, a diac and a break-over diode.

8. The input circuit arrangement according to claim 1, wherein the arrangement includes the second capacitor and the protective element, the second capacitor and the protective element are arranged in parallel, and a first terminal of the second capacitor is connected to the first input terminal and a second terminal of the second capacitor is connected to the second input terminal.

9. The input circuit arrangement according to claim 8, wherein the protective element includes at least one of a varistor, a diac and a zener diode.

\* \* \* \* \*